United States Patent [19]

Armitage

[11] 4,351,931

[45] Sep. 28, 1982

[54] POLYETHYLENE COPOLYMERS

[75] Inventor: John B. Armitage, Sharpley, Del.

[73] Assignee: E. I. Du Pont de Nemours and Company, Wilmington, Del.

[21] Appl. No.: 164,074

[22] Filed: Jul. 19, 1971

Related U.S. Application Data

[63] Continuation-in-part of Ser. No. 349,759, Mar. 5, 1964, abandoned, which is a continuation-in-part of Ser. No. 119,265, Jun. 26, 1961, abandoned.

[51] Int. Cl.$^3$ .................... C08F 2/02; C08F 220/06
[52] U.S. Cl. .................... 526/227; 428/461; 526/218; 526/235; 526/317
[58] Field of Search .......... 260/88.1 R; 117/132; 161/182; 526/317, 86, 87, 218, 227, 235

[56] References Cited

U.S. PATENT DOCUMENTS

| | | | |
|---|---|---|---|
| 2,395,381 | 2/1946 | Squires | 260/88.1 R |
| 2,851,372 | 9/1958 | Kaplan et al. | 117/132 C |
| 2,953,551 | 9/1960 | White | 260/86.7 |
| 3,132,120 | 5/1964 | Graham | 260/88.1 R |
| 3,198,776 | 8/1965 | Miller et al. | 260/86.7 |
| 3,239,370 | 3/1966 | Thomson et al. | 117/161 |
| 3,350,372 | 10/1967 | Anspon et al. | 260/86.7 |
| 3,436,363 | 4/1969 | Helin | 260/29.6 |
| 3,437,626 | 4/1969 | Glabisch | 260/29.6 |
| 3,520,861 | 7/1970 | Thomson et al. | 260/88.1 R |

FOREIGN PATENT DOCUMENTS 655298 1/1963 Canada .

OTHER PUBLICATIONS

Billmeyer, Textbook of Polymer Chemistry, (1957), Interscience Publisher, Inc., N.Y., p. 239.

*Primary Examiner*—Edward J. Smith

[57] ABSTRACT

High molecular weight uniformly random copolymers of ethylene and acrylic or methacrylic acid containing up to 10 weight percent of the acid.

31 Claims, No Drawings

POLYETHYLENE COPOLYMERS

This invention relates to ethylene copolymers, and, more particularly, to copolymers of ethylene and certain acid comonomers. This application is a continuation-in-part of application Ser. No. 349,759 filed Mar. 5, 1964, now abandoned which in turn is a continuation-in-part of application Ser. No. 119,265, filed June 26, 1961 and now abandoned.

It is an object of the present invention to provide new ethylene copolymers. A further object is to provide ethylene copolymers which are especially well suited for adhesive and coating purposes. Still another object is to provide new copolymers of ethylene with certain acid comonomers. Other objects will become apparent hereinafter.

The objects of the present invention are accomplished by a copolymer of ethylene and 0.1 to 10 weight percent of an $\alpha,\beta$-ethylenically unsaturated acid selected from the class consisting of acrylic acid and methacrylic acid, said copolymers having a melt index in the range of 0.01 to 30 g/10 min., as determined by ASTM-D-1238-57T.

The copolymers of the present invention combine superior adhesion, toughness, flexibility and printability with low permeability, high rigidity and stiffness, and good solvent and moisture resistance. One of the surprising features of the resins of the present invention is the increase of adhesion obtained in the range of comonomer concentrations stated combined with the retention of desirable properties of polyethylene, such as rigidity and solvent and moisture resistance. Additionally, the copolymers of the present invention can be readily handled at temperatures below their melting points, 110°–120° C., at which they show little or no tendency to stick and can also be fabricated in standard polyethylene equipment. Thus, the resins of the present invention are extremely useful as adhesives in such uses as the production of nonwoven fabrics, as binders in such uses as the preparation of laminates, and as coating resins in such uses as the coating of paper products.

Polyethylene homopolymers have low adhesive properties, poor printability and are not suitable without special treatment as adhesives or as laminating resins. However, the introduction in accord with the process of this invention of as little as 0.1 weight percent, based on the copolymer, of the acid comonomer greatly increases the adhesive properties of the polymer. Acid component contents greater than about 10 weight percent do not significantly add to the adhesiveness or the printability of the copolymer. On the other hand, such increases in comonomer content cause some properties, which are inherent in high molecular weight polyethylene and which are desirable in an adhesive, to decrease. Acid comonomers such as are employed in the formation of the copolymers of the present invention act as telogens in the polymerization of ethylene, and, hence, if employed in high concentrations result only in low molecular weight products which do not have the toughness and flexibility, particularly at low temperatures, for which polyethylene is so well known. The incorporation of acid comonomers in excess of about 10 weight percent causes a significant decrease in the rigidity of the polymer product, which rigidity is often needed, particularly in laminating applications. Furthermore, the addition of more than 8 mole percent of acid comonomer causes a significant decrease in organic solvent resistance and moisture resistance, which are highly desirable in an adhesive or in a coating resin. The greatly surprising feature of the copolymers of the present invention is that the introduction of the acid comonomer in the indicated concentrations and in the uniformly random manner of this invention results in a tremendous increase in adhesiveness combined with an unusually small decrease in the mechanical properties as compared to polyethylene.

The copolymers of the present invention are also extremely useful starting materials for the preparation of polymer derivatives. Thus, the acid copolymers can be reacted with metal salts of mono- and divalent metals, which are soluble in aqueous media, under conditions at which the by-product formed from the hydrogen ion and the salt anion is removed to give rise to ionically linked materials which have properties of crosslinked resins at temperatures below their melting points and yet are melt-fabricable at temperatures above their melting points. A particularly outstanding property of the ion-linked copolymers is their transparency.

The copolymers of the present invention may also be reacted with diamines to give rise to weather-resistant, transparent polymer compositions. The surprising feature of the latter copolymers is the fact that the copolymer remains substantially unchanged in its melt flow properties despite the reaction of the diamine with the acid groups of the copolymer.

The copolymers of the present invention may be reacted with phosphorus pentachloride to produce acid halide copolymers which can be reacted with hydroxyl group- or amino group-containing surfaces to form coatings which are chemically bonded to the substrate. Additionally, such acid halide copolymers can be reacted with compounds which contain an active hydrogen group, such as a hydroxyl group or an amino group, and which modify the properties of polymers to which they are added by imparting resistance to oxidative degradation, improved light stability, and anti-static properties. These improved properties are retained on reaction of the additive with the acid halide copolymer. As a result, highly effective nonexuding polymeric modifiers are obtained which when incorporated into other polymers, are compatible therewith and do not exude.

Other uses for the copolymers of the present invention are as blending components for condensation polymers such as polyamides and polyesters where the addition of the ethylene/acid copolymers causes bonding of the acid group to the hydroxyl groups of the polyester or the amino groups of the polyamide, thereby improving the toughness of the condensation polymers. The ethylene/acid copolymers of the present invention may also be crosslinked by reaction with metal oxides giving rise to intractable compositions having good mechanical properties at elevated temperatures.

The outstanding utility of ethylene/acid copolymers in these applications is made feasible only by the use of the copolymers of the present invention and is due to the particular, unique, homogeneous structure of the copolymers of the present invention, as described hereinbelow in greater detail.

Most ethylene copolymers with polar comonomers produced heretofore have been produced either in an aqueous system, at low pressures, i.e., up to 500 atmospheres, in batch processes, or at high pressures in tubular reactors with changing concentration profiles. However, these conditions do not result in the novel, high-molecular weight, uniformly random copolymers of the present invention. It will be readily recognized that in order to achieve high molecular weight in the copolymers of the present invention, it is necessary to employ polymerization conditions which result in high-molecular weight homopolymers of ethylene, since ethylene is the major component, particularly when considered on a molar basis. In view of the telogenic nature of the comonomer acids, however, it is not only necessary to employ conditions which result in high-molecular weight polymers in the homopolymerization, but conditions which result in high-molecular weight polymers in the presence of telogens. Conditions which result in high-molecular weight copolymers wherein the acid component is a major constituent are readily available since, as between the unsaturated acid and ethylene, the unsaturated acid is a substantially more active monomer which polymerizes more readily than ethylene and over a substantially wider range of conditions. The copolymerization of ethylene and the described unsaturated acids to result in high-molecular weight copolymers, i.e., copolymers having a melt index in the range of 0.01 to 30 g/10 min., as determined by ASTM-D-1238-57T, wherein the ethylene content is at least 90 weight percent requires high ethylene pressures of at least 1000 atmospheres, and preferably from 1500 to 3000 atmospheres, and a substantially telogen-free (aside from the comonomer) single phase polymerization environment in which both monomers are soluble and in which preferably the copolymer is also soluble. At low polymerization temperatures controlled small amounts of telogen may be added to make copolymers in the high end of the melt index range.

Solvent systems which are suitable for the process comprise solvent systems heretofore used for polyethylene, such as benzene or chlorobenzene, or tertiary butanol. Bulk polymerization in the substantial absence of added solvent, except as necessary to dissolve the initiator added, is also a very satisfactory procedure. Where the comonomer is not sufficiently soluble to allow a single phase polymerization, a suitable comonomer solvent (i.e., benzene) is added. The reaction temperature is in the range of 90° C. to 280° C., and preferably, in the range of 150° C. to 240° C.

The utility of the copolymers of the present invention requires a copolymer which contains the acid comonomer randomly dispersed throughout the entire polymer molecule in all molecules of the polymer, i.e., a uniformly random, homogeneous copolymer. In order to achieve such a copolymer, it is necessary in addition to the aforementioned conditions, to employ a continuous polymerization process which provides a constant environment for the polymerization. Thus, it was discovered that the polymer-forming reactivity of the unsaturated acid monomer is from 5 to 10 times that of the ethylene. Because of this substantial difference in reactivities, it is not only necessary to reduce the concentration of the comonomer in the feed in accordance with the reactivity ratio, in order to obtain a copolymer of the desired acid content, but it is also essential to employ a continuous process in which the conversion is controlled to maintain a substantially constant temperature. In concentrated ethylene polymerization systems, a practical conversion of 3 to 20 percent is employed. In dilute systems, considerably higher conversions are attainable. It has been discovered that by maintaining a high ratio in line with the reciprocal of the reactivity ratio of ethylene to comonomer fed to the polymerization reactor, maintaining a constant environment in the reactor, and removing a total of polymerized and unpolymerized monomers corresponding to the charged monomers, it is possible to obtain the uniformly random, homogeneous copolymers of this invention. Depending upon other conditions and the particular concentration of acid comonomer units desired in the copolymer, the monomers are fed to the autoclave in a ratio of ethylene to comonomer of about 10,000 to 1 to about 50 to 1, by weight. A constant environment in the reactor can be achieved by rapid end-over-end mixing.

In contrast, in a batch or tubular process the difference in reactivities of the comonomers results in a copolymerization in which polymers with a very high acid content are formed initially and, if permitted to continue, the acid monomer will be substantially used up, following which the polymerization becomes substantially a homopolymerization of ethylene. As a result the heterogeneous product comprises a spectrum of polymer molecules ranging all the way from essentially homopolymers of the unsaturated acid to polyethylene. On the other hand, the use of a continuous process under conditions above described results in an entirely different product, one which has uniformly random comonomer distribution and substantially uniform comonomer content in each polymer molecule and is, therefore, substantially homogeneous in contrast to the batch produced product, which is highly heterogeneous.

The nonuniform structure of ethylene-methacrylic acid copolymers produced in a tubular or batch process is particularly well illustrated in Table A. This table can be used to compare the composition of an ethylene-methacrylic acid copolymer, such as is obtained by using a tubular or batch process, with the composition of an ethylene-methacrylic acid copolymer of this invention made using the continuous, constant environment process of the present invention, in which both copolymers have the same average methacrylic acid comonomer content. Using the experimental equipment described in the examples, a residence time of 0.5 minutes, an 85 percent conversion of the methacrylic acid and a 10 percent conversion of the ethylene to result in a 10 percent by weight copolymer, the appropriate rate constants were calculated. These constants were then used to determine the composition of a copolymer made in a batch reactor allowed to run for two minutes at constant ethylene pressure to give an average of 10 weight percent of methacrylic acid in the resultant product. The substantially homogeneous copolymer obtained by the continuous constant environment process of this invention consists essentially of polymer molecules in which the uniformly randomly distributed acid comonomer content is from 9.0 to 11.0 percent by weight. This range is the result of the practical inability to operate the equipment at an absolutely constant environment due to the limitations inherent in the equipment employed. The comonomer distribution of the batch copolymer as calculated from the rate constants, is shown in Table A.

TABLE A

| Percent of Copolymer | Comonomer Concentration in such Fraction in percent (wt.) |
|---|---|
| 1.8218 | 68.7158–71.5789 |
| 1.5809 | 65.8526–68.7158 |
| 1.3957 | 62.9895–65.8526 |
| 1.2509 | 60.1263–62.9895 |
| 1.1362 | 57.2632–60.1263 |

TABLE A-continued

| Percent of Copolymer | Comonomer Concentration in such Fraction in percent (wt.) |
|---|---|
| 1.0445 | 54.4000–57.2632 |
| 0.9709 | 51.5368–54.4000 |
| 0.9119 | 48.6737–51.5368 |
| 0.8650 | 45.8105–48.6737 |
| 0.8284 | 42.9474–45.8105 |
| 0.8009 | 40.0842–42.9474 |
| 0.7818 | 37.2111–40.0842 |
| 0.7708 | 34.3579–37.2211 |
| 0.7678 | 31.4947–34.3579 |
| 0.7735 | 28.6316–31.4947 |
| 0.7891 | 25.7684–28.6316 |
| 0.8166 | 22.9053–25.7684 |
| 0.8594 | 20.0421–22.9053 |
| 0.9234 | 17.1789–20.0421 |
| 1.0191 | 14.3158–17.1789 |
| 1.1664 | 11.4526–14.3158 |
| 1.4091 | 8.5895–11.4526 |
| 1.8643 | 5.7263–8.5895 |
| 2.9951 | 2.8632–5.7263 |
| 1.2013 | 2.1474–2.8632 |
| 1.6683 | 1.4316–2.1474 |
| 2.8099 | 0.7158–1.4316 |
| 66.7770 | 0–.7158 |

From the foregoing table it is apparent that the batch polymerization produces about one percent of copolymer molecules having a 10 percent acid concentration, even though the overall concentration of all the polymer molecules is 10 percent. It will be apparent that although one percent of the batch produced polymer molecules are essentially the same as the polymer molecules produced by the process of the present invention, it is not possible to separate this particular fraction from the remainder, about 65% of which is substantially homopolymer.

The use of uniformly random ethylene/acid copolymers is particularly important in the production of the derivatives described above. Unless the acid group has a uniformly random distribution, the derivatives will not have their derivative groups randomly dispersed throughout the copolymer. This, in turn will mean that the properties resulting from the formation of the derivatives will not be uniform throughout the copolymer thereby decreasing the utility of such derivatives. Non-uniformity in the distribution of derivative groups is particularly noticeable in those derivatives which impart transparency.

Thus, copolymers heretofore prepared tend to reflect the unsatisfactory properties obtained by making the derivative of an acid homopolymer and then blending such with polyethylene. This is particularly noticeable in two applications. Thus as indicated hereinabove, the copolymers of the present invention can be reacted with diamines to give rise to weather-resistant transparent polyolefins which retain their melt flow properties. If a nonuniformly random copolymer of the prior art is employed, i.e., a copolymer which contains fractions with very high acid content and fractions with very low acid content, the diamine-reacted product has intractable portions as a result of the high concentration of acid in a number of molecules and also other portions which remain unchanged as compared to polyethylene.

Another example of the importance of having a homogeneous copolymer is provided in the use of the acid copolymers as outstanding adhesives. In many adhesive applications, it is preferred to apply the copolymers in the form of a dispersion which is obtained by emulsifying a polymer solution in a nonmiscible solvent in water and removing the organic solvent. The copolymers heretofore prepared cannot be made into dispersions since the acid-containing molecules of the copolymer are insoluble in nonmiscible organic solvents.

The solubility characteristics of the uniformly random homogeneous copolymers of this invention distinguishes them from the copolymers of the prior art. Thus, the copolymers of the present invention are substantially insoluble (<1 weight percent) in boiling methanol and substantially completely soluble (>99 weight percent) in n-octanol at 125° C. and on extraction with methanol show no significant change in acid concentrations. A nonuniformly random copolymer containing greater than 2 mole percent of acid, on the other hand, has significant solubility in boiling methanol (>20 percent) and is only partially soluble (<90 percent soluble) in octanol. Furthermore, extraction of nonuniform copolymers with methanol causes a significant change in the acid concentration of the copolymer.

In general the polymerization of the comonomers is initiated by the free radical forming compounds known to the art for polymerizing ethylene, such as oxygen, a peroxide or an azo-bis compound. Suitable peroxides include benzoyl peroxide, lauryl peroxide, t-butyl peracetate. A suitable azo initiator is azo-bis(isobutyronitrile). The quantity and preferred type of initiator is in accordance with the art established for the homopolymerization of ethylene.

The polymerization is preferably carried out in a stirred autoclave, agitated at high rates such as 250 rpm and higher to maintain a constant environment. Ethylene, the acid comonomer, which may be dissolved in ethylene or another suitable solvent, and initiator, also dissolved in a suitable solvent, are injected into the autoclave. The agitator is started and the feed is continued until the desired pressure is reached, at which time a discharge valve is opened to maintain the desired pressure. The temperature of the reactants is then built up to the "light off" state by any suitable means, such as for example, by the use of a heating jacket surrounding the autoclave, the use of internal or external electrical type heaters or the like. At these pressures and temperatures the reagents exist as a uniform phase. "Light off" occurs when the temperature is reached at which the polymerization initiator begins to generate free radicals at an appreciable rate. The free radicals induce the polymerization of the monomers and since this reaction is exothermic, the temperature is observed to rise. When the temperature rises slightly the initiator produces free radicals at a faster rate and the exothermic polymerization of ethylene proceeds still faster. For this reason a marked temperature surge is observed as the reaction "lights off". Once "light off" is obtained, the application of heat through jackets into the reaction mixture and/or feed streams may be discontinued. The reaction temperature, within narrow limits, is then maintained by controlling the amount of exothermic polymerization which also maintains a definite monomer to polymer ratio within the autoclave. In accord with the type of polymer it is desired to produce, the temperature within the reactor is allowed to build up to the exact temperature that will produce that type of polymer. This is accomplished by regulating the rate at which the initiator is fed to the reactor. The exothermicity of the reaction and, therefore, the molecular properties of the polymer desired are therefore controlled by the amount of heating applied to the feed streams and the amount of initiator introduced. The resulting polymer solution is passed through a pressure let-down valve into a vessel maintained at a substantially reduced pressure, as compared to the polymerization autoclave, and at a temperature well above the melting point of the polymer; in this vessel, every reagent except the polymer is flashed off. The polymer is isolated and cooled to room temperature.

The synthesis of the resins of the present invention and some fundamental properties of the resulting resins are further illustrated by the Examples described in Table I. In Runs 1-9, the polymerization was carried out in a two-liter, stirred autoclave. All reagent streams were maintained at a temperature of 25° C. The initiator employed was t-butyl peracetate unless otherwise indicated. Ethylene was charged to the reactor as a separate stream. Catalyst and comonomer were charged as separate streams as solutions in benzene.

In Run 10 a constant environment reactor having a volume of approximately one cu. ft., agitated at 1800 rpm, was employed. The reagents were fed as separate streams at a temperature of 40° C. The catalyst employed in Run 10 was tertiary butyl perisobutyrate. The quantity of solvent, ethylene, methacrylic acid and copolymer discharged from the reactor corresponded to the quantity of solvent, ethylene and methacrylic acid charged. The ratio of the ethylene to methacrylic acid polymerized and unpolymerized corresponded to the ratio of ethylene to methacrylic acid charged. Table I also shows some of the physical properties of the comonomer obtained.

TABLE I

| Run | Copolymer | Reactor Conditions | | Cat. Demand lb cat/1000# of polymer | Feed Streams in pph | | | | |
|---|---|---|---|---|---|---|---|---|---|
| | | Press. Atms. | Temp °C. | | Ethylene | Comonomer | Catalyst × $10^{-6}$ | Benzene | Cosolvent |
| 1 | Ethylene/Acrylic Acid | 1100 | 235 | 0.088 | 10 | 0.001 | 141 | 7.35 | 1.0(toluene)* |
| 2 | Ethylene/Acrylic Acid | 1200 | 238 | 0.0895 | 10 | 0.01 | 136 | 6.82 | 1.05(toluene)* |
| 3 | Ethylene/Acrylic Acid | 1400 | 230 | 0.131 | 10 | 0.06 | 208 | 7.75 | 0.9(toluene)* |
| 4 | Ethylene/Acrylic Acid | 1450 | 213 | 0.177 | 10 | 0.128 | 270 | 6.82 | 1.0(toluene)* |
| 5 | Ethylene | 1200 | 233 | 0.073 | 10 | — | | 7.0 | — |
| 6 | Ethylene/Methacrylic Acid | 1200 | 230 | 0.096 | 10 | 0.01 | 140 | 7.63 | — |
| 7 | Ethylene/Methacrylic Acid | 1200 | 231 | 0.108 | 10 | 0.02 | 163 | 7.75 | — |
| 8 | Ethylene/Methacrylic Acid | 1350 | 224 | 0.113 | 10 | 0.058 | 179 | 7.23 | — |
| 9 | Ethylene/Methacrylic Acid | 1350 | 202 | 0.185 | 10 | 0.127 | 286 | 8.96 | — |
| 10 | Ethylene/Methacrylic Acid | 1520 | 226 | 0.9 | 1220 | 12.6 | — | 23.4 | None |

| Run | Copolymer | Solvent/Total Monomer Ratio | Reactor Residence Time/min | Polymer Yield pph | Comonomer Content in wt. % | Melt Index g/10 min** | Stiffness psi*** | Density g/cc**** |
|---|---|---|---|---|---|---|---|---|
| 1 | Ethylene/Acrylic Acid | 0.735 | 7.4 | 1.60 | 0.12 | 3.0–5.5 | 15,040 | 0.915 |
| 2 | Ethylene/Acrylic Acid | 0.682 | 7.6 | 1.52 | 0.45 | 3.8–7.8 | 14,636 | 0.917 |
| 3 | Ethylene/Acrylic Acid | 0.77 | 7.8 | 1.59 | 2.5 | 4.0–5.3 | 16,521 | 0.923 |
| 4 | Ethylene/Acrylic Acid | 0.673 | 8.5 | 1.53 | 5.7 | 1.7–2.0 | — | 0.932 |
| 5 | Ethylene | | 7.5 | 1.5 | — | 0.9–2.1 | 18,895 | 0.916 |
| 6 | Ethylene/Methacrylic Acid | 0.761 | 7.5 | 1.46 | 0.48 | 1.3–2.5 | 19,415 | 0.913 |
| 7 | Ethylene/Methacrylic Acid | 0.772 | 7.5 | 1.49 | 1.18 | 4.4–5.2 | 19,294 | 0.915 |
| 8 | Ethylene/Methacrylic Acid | 0.72 | 7.3 | 1.58 | 2.29 | 2.9–3.6 | 19,651 | 0.918 |
| 9 | Ethylene/Methacrylic Acid | 0.875 | 7.5 | 1.55 | 5.21 | 4.3–5.7 | 19,820 | 0.927 |
| 10 | Ethylene/Methacrylic Acid | — | ~1 | 160 | 4.8 | 1.0 | — | 0.9268 |

*Added after polymerization to facilitate polymer purification
**ASTM D-1238-57T
***ASTM D- 747-58T
****D-792-50

The surprising combination of properties obtained with the copolymers of the present invention is shown in Table II where the retention of desirable polyethylene properties, such as stiffness and tear strength of films, is compared with the improvement in adhesive properties obtained with increasing concentrations of the acid comonomers when the copolymers are employed as the binders in the preparation of laminated structures with metal foils (illustrated by aluminum) or with plastic films (illustrated by "Mylar" poly(ethyleneterephthalate) film), and when printing ink is applied to films of the copolymers:

TABLE II

| Copolymer | Wt. % Comonomer Content | Film Stiffness in psi | Film Elemendorf Tear in g/ml | Shore Hardness | % Ink Removed | Adhesion (gm/inch width) | |
|---|---|---|---|---|---|---|---|
| | | | | | | Aluminum | "Mylar", Polyester Film |
| Ethylene/Acrylic Acid Copolymer | 0.12 | 15,040 | 175 | 52(D) | 95 | — | — |
| | 0.45 | 14,636 | 170 | 51(D) | — | 1600 | — |
| | 2.5 | 16,525 | 227 | 52(D) | — | 2500 | — |
| | 5.7 | 14,961 | 425 | 55(D) | 0 | 2700 | — |
| Ethylene/Methacrylic Acid Copolymer | 0.48 | 19,415 | 200 | 47(D) | 100 | — | — |
| | 1.18 | 19,294 | 210 | 49(D) | 90 | 1400 | — |
| | 2.29 | 19,651 | 225 | 51(D) | — | 2500 | 40 |
| | 5.21 | 19,820 | 406 | 50(D) | 60 | 2700 | 60 |

Stiffness was determined by ASTM-D-747-58T. The Elemendorf Tear Strength and Shore Hardness are well known tests. The percent ink removed was measured by the "'Scotch' tape test" in which ink is applied to a film of the material and after drying, pressure-sensitive tape is applied to the inked material and then stripped off and the percentage of ink removed is calculated. For the laminates, adhesion, as measured by peel strength, was obtained at a separation rate of 6"/min. The test samples were prepared by placing a 1 to 5 mil compression molded film of the acid copolymer between two layers of the foil to which adhesion was tested. The sandwich was placed in the jaws of the heat sealer to give a seal 1"×4" at 250° C. under 60 psi. pressure with a dwell time of 0.15 seconds. The force required to peel the laminate was measured.

The novel ethylene copolymers of the present invention are useful as coating resins and as adhesives. They can be employed in the melt-coating of cardboard, paper, metal foil, other plastic films, such as poly(ethyleneterephthalate) films, regenerated cellulose films (cellophane), and many other surfaces. Thus, cellophane can be rendered both moistureproof and heat sealable by applying a thin coating of the copolymers of this invention to one or both sides of the cellophane foil using standard melt-coating apparatus and procedures. They also are useful as laminating resins to bond such hydrocarbon polymers as polyethylene and polypropylene to the aforementioned substrates. In the adhesive field the copolymers of the present invention are particularly useful as binders for fibers. As indicated above, the uniformly random copolymers may also be employed as starting material for the formation of acid copolymer derivatives which have properties not generally associated with polyethylene.

I claim:

1. A uniformly random, homogeneous copolymer of ethylene and an α, β-ethylenically unsaturated acid selected from the class consisting of acrylic acid and methacrylic acid, said copolymer exhibiting improved adhesion to solid metallic substrates and being composed of at least about 90% by weight ethylene and having at least 0.45% by weight of said unsaturated acid copolymerized therewith and uniformly randomly distributed along the copolymer chains, and said copolymer having a melt index of 0.01 to 30 g/10 min.

2. The copolymer of claim 1 in which the acid comonomer copolymerized with ethylene in the copolymer is acrylic acid.

3. The copolymer of claim 2 in which the melt index is 3.8 to 7.8 g/10 minutes and the acrylic acid content is 0.45 weight percent.

4. The copolymer of claim 2 in which the melt index is 4.0 to 5.3 g/10 minutes and the acrylic acid content is 2.5 weight percent.

5. The copolymer of claim 2 in which the melt index is 1.7 to 2.0 g/10 minutes and the acrylic acid content is 5.7 weight percent.

6. The copolymer of claim 1 in which the acid comonomer copolymerized with ethylene in the copolymer is methacrylic acid .

7. The copolymer of claim 6 in which the melt index is 1.3 to 2.5 g/10 minutes and the methacrylic acid content is 0.48 weight percent.

8. The copolymer of claim 6 in which the melt index is 4.4 to 5.2 g/10 minutes and the methacrylic acid content is 1.18 weight percent.

9. The copolymer of claim 6 in which the melt index is 2.9 to 3.6 g/10 minutes the methacrylic acid content is 2.29 weight percent.

10. The copolymer of claim 6 in which the melt index is 4.3 to 5.7 g/10 minutes and the methacrylic acid content is 5.21.

11. The copolymer of claim 10 in the form of a self-supporting film.

12. A laminated structure in which the binder is the copolymer of claim 10.

13. Metal foil coated with the copolymer of claim 1.

14. The coated metal foil of claim 13 in which the metal is aluminum.

15. Aluminum foil coated with the composition of claim 2.

16. Aluminum foil coated with the composition of claim 3.

17. Aluminum foil coated with the composition of claim 4.

18. Aluminum foil coated with the composition of claim 5.

19. Aluminum foil coated with the composition of claim 6.

20. Aluminum foil coated with the composition of claim 7.

21. Aluminum foil coated with the composition of claim 8.

22. Aluminum foil coated with the composition of claim 9.

23. Aluminum foil coated with the composition of claim 10.

24. A copolymer according to claim 2 in the form of a thin sheet consisting essentially thereof.

25. A copolymer according to claim 2 in the form of a layer in a consolidated laminar structure of at least two dissimilar laminar layers.

26. The process of preparing a uniformly random homogeneous copolymer of ethylene and an α,β-ethylenically unsaturated acid, selected from the class consisting of acrylic acid and methacrylic acid, said copolymer being composed of at least about 90% by weight ethylene, based on copolymer, and having at least 0.45% by weight of said unsaturated acid uniformly randomly distributed along the copolymer chains, by continuously charging ethylene, said unsaturated acid and a free radical initiator, selected from the group consisting of oxygen, peroxide and azo-bis compounds, into a single phase reaction zone stirred at a high rate and maintained at a preselected pressure of at least 1000 atmospheres of ethylene and at a preselected temperature maintained within narrow limits at a value between 90° and 280° C., the ratio of ethylene to unsaturated acid charged being in the range of 10,000/1 to 50/1 by weight, and maintaining a definite monomer to polymer ratio in the reaction zone and regulating the concentration of initiator fed into the reactor at a predetermined value while allowing said unsaturated acid and ethylene to copolymerize in said reaction zone, and continuously removing from reactor a stream consisting of unreacted ethylene, unreacted unsaturated acid, and the copolymer at a rate such that the reactor residence time permits conversion of 3 to 20% of the ethylene to polymer, through a pressure let-down valve to a zone maintained at substantially reduced pressure from which all reagents are flashed off leaving the copolymer product.

27. The process as set forth in claim 26 wherein the temperature is from 150° to 240° C. and the pressure from 1500 to 3000 atmospheres.

28. The process as set forth in claim 26 wherein the initiator is a peroxide.

29. The process as set forth in claim 26 wherein the polymerization is carried out in an inert solvent.

30. The process as set forth in claim 29 wherein the solvent is benzene.

31. The process of claim 26 wherein the acid comonomer is acrylic acid.

* * * * *